United States Patent
Schneier

(10) Patent No.: US 10,813,442 B1
(45) Date of Patent: Oct. 27, 2020

(54) PORTABLE, SELF-CONTAINED, TOOTHBRUSH WITH INTERNAL WATER, WASTE RESERVOIR AND TOOTHPASTE SUPPLY

(71) Applicant: Lance W. Schneier, Dublin, OH (US)

(72) Inventor: Lance W. Schneier, Dublin, OH (US)

(*) Notice: Subject to any disclaimer, the term of this patent is extended or adjusted under 35 U.S.C. 154(b) by 0 days.

(21) Appl. No.: 16/779,076

(22) Filed: Jan. 31, 2020

(51) Int. Cl.
| | |
|---|---|
| *A46B 11/00* | (2006.01) |
| *A61C 17/02* | (2006.01) |
| *A46B 9/04* | (2006.01) |
| *A46B 17/04* | (2006.01) |
| *A46B 7/04* | (2006.01) |
| *A46B 5/00* | (2006.01) |

(52) U.S. Cl.
CPC ........ *A46B 11/0062* (2013.01); *A46B 5/0095* (2013.01); *A46B 7/042* (2013.01); *A46B 9/04* (2013.01); *A46B 11/002* (2013.01); *A46B 11/0075* (2013.01); *A46B 17/04* (2013.01); *A61C 17/0202* (2013.01); *A46B 2200/01* (2013.01); *A46B 2200/1066* (2013.01)

(58) Field of Classification Search
CPC ... A46B 11/0062; A46B 5/0095; A46B 7/042; A46B 9/04; A46B 11/002; A46B 11/0075; A46B 17/04; A61C 17/0202
See application file for complete search history.

(56) References Cited

U.S. PATENT DOCUMENTS

| | | | | |
|---|---|---|---|---|
| 4,071,300 | A * | 1/1978 | Nichols | A46B 11/0027 401/175 |
| 4,294,269 | A * | 10/1981 | Kyte | A46B 5/0095 132/309 |
| 6,047,429 | A * | 4/2000 | Wu | A61C 17/36 15/29 |
| 6,099,813 | A * | 8/2000 | Gipson, II | A61L 2/22 132/308 |
| 6,336,428 | B1 * | 1/2002 | Locke | A01K 13/002 119/611 |
| 6,739,782 | B1 * | 5/2004 | Rehkemper | A46B 11/0041 401/152 |
| 7,011,467 | B1 * | 3/2006 | Fiore (the younger) | A46B 11/0055 401/188 R |
| 8,668,397 | B2 * | 3/2014 | Barkhordar | A46B 11/0006 15/22.1 |
| 2002/0088474 | A1 * | 7/2002 | Montalvo | A46B 15/0071 132/309 |
| 2004/0187889 | A1 * | 9/2004 | Kemp | A46B 5/0095 132/311 |

(Continued)

*Primary Examiner* — Nicholas D Lucchesi
(74) *Attorney, Agent, or Firm* — Standley Law Group LLP; James L. Kwak; Kenny W. Pung

(57) ABSTRACT

A portable toothbrush having an internal water source that allows a user to brush his or her teeth while away from a bathroom or other external water source. The portable toothbrush has an internal water source for dispensing water into a user's mouth and a storage receptable for suctioning waste or rinse water from the user's mouth back into the storage receptacle for disposal after use. The toothbrush may have the toothpaste impregnated on the toothbrush head or the toothpaste may be contained in refillable receptacle as a part of the toothbrush head. The toothbrush of the present invention can be automatic (electric motor or pump) or manual. The toothbrush can be a one-time use toothbrush or multiple-use.

16 Claims, 1 Drawing Sheet

(56) References Cited

U.S. PATENT DOCUMENTS

| | | | | |
|---|---|---|---|---|
| 2010/0175214 A1* | 7/2010 | Payet | ............. | A61J 7/0053 |
| | | | | 15/167.1 |
| 2011/0308030 A1* | 12/2011 | Jimenez | ............. | A61C 17/227 |
| | | | | 15/167.1 |
| 2012/0077143 A1* | 3/2012 | Fougere | ............. | A46B 9/045 |
| | | | | 433/82 |
| 2012/0276499 A1* | 11/2012 | Devery | ............. | A46B 11/0017 |
| | | | | 433/32 |
| 2012/0301209 A1* | 11/2012 | Fattori | ............. | A46B 11/0041 |
| | | | | 401/171 |
| 2016/0135581 A1* | 5/2016 | Pai | ............. | A46B 5/0095 |
| | | | | 433/216 |
| 2016/0331117 A1* | 11/2016 | Follows | ............. | A61C 17/227 |
| 2018/0110321 A1* | 4/2018 | Harris | ............. | G02B 1/14 |
| 2018/0110322 A1* | 4/2018 | Marsh | ............. | A46B 15/0044 |
| 2018/0168330 A1* | 6/2018 | Davies-Smith | ............. | A46B 11/002 |
| 2018/0184795 A1* | 7/2018 | Pai | ............. | A61C 17/349 |
| 2019/0343270 A1* | 11/2019 | Davies-Smith | ............. | A46B 11/0082 |

* cited by examiner

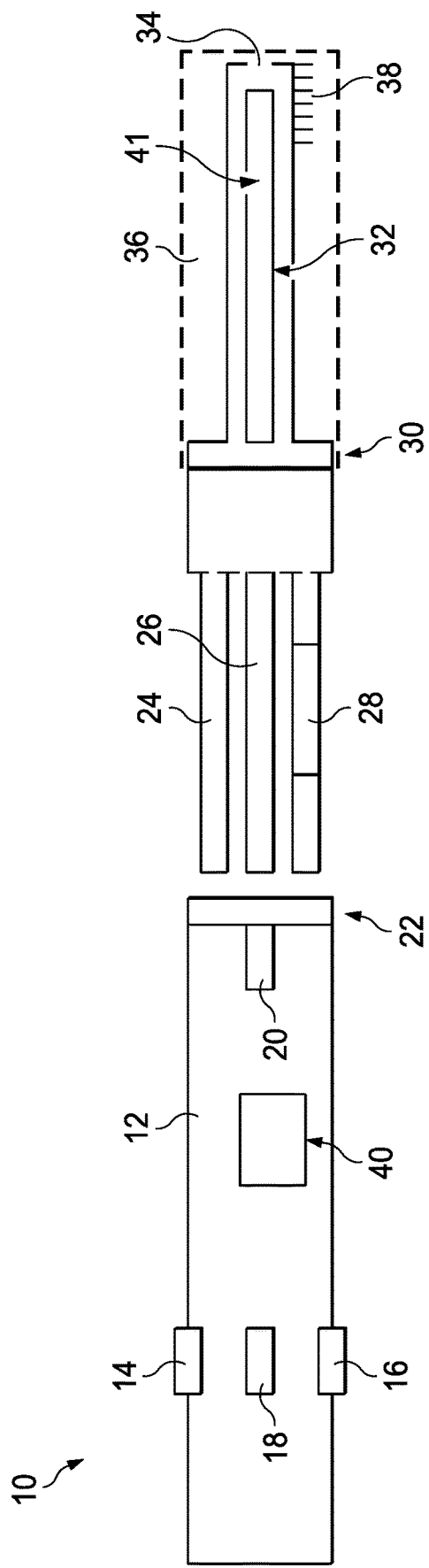

PORTABLE, SELF-CONTAINED, TOOTHBRUSH WITH INTERNAL WATER, WASTE RESERVOIR AND TOOTHPASTE SUPPLY

BACKGROUND OF THE INVENTIVE FIELD

The present invention is directed to a portable, self-contained, toothbrush with internal water supply. The toothbrush of the present invention allows a user to brush their teeth on-the-go, even when there is no available external water source or receptacle to expel the spent water and toothpaste when the user is finished brushing.

Brushing one's teeth is needed for three main reasons: 1) to maintain healthy teeth and gums; 2) to eliminate food particles that may be visible to others; and 3) to maintain fresh breath. Toothbrushing is easier when at home or at the office as there is access to a toothbrush, toothpaste, water and a sink. When away from home or the office, users currently have to make do with other, suboptimal options.

A complete toothbrushing experience includes all the following steps:
  Application of toothpaste on a toothbrush;
  Wetting of toothbrush;
  Mechanics of brushing;
  Rinsing out toothpaste with water; and
  Expelling rinse water and excess toothpaste.

Currently there is no single, self-contained apparatus that enables all of the above steps for full toothbrushing. The complete toothbrushing experience of the present invention provides a portable solution to enable users to perform all the tasks necessary to create, not just replicate, full brushing of teeth.

SUMMARY OF THE GENERAL INVENTIVE CONCEPT

The toothbrush of the present invention, preferably has the following features:
  Stores toothpaste;
  Stores fresh water;
  Enables rinse water to be disposed back or suctioned into a waste receptacle within the toothbrush with no external receptacle;
  Small and discrete;
  Usable anywhere, such as in a vehicle or in public;
  Single use and removable head and cartridges for portability, storage and sanitation.

In one embodiment of the invention, a portable toothbrush is comprised of: a base portion having a first end, the base portion adapted to be gripped by a user; a removeable portion having a bristle area, the removable portion removably engaged to the first end of the base portion; a fluid opening in the removable portion; water source contained within the removable portion; first controller on the base portion operationally connected to the water source, wherein the water source is adapted to dispense water from the water source into the user's mouth when the first controller is actuated; a storage receptacle contained within the removeable portion; a second controller on the base portion operationally connected to the storage receptacle and wherein the storage receptacle is adapted to suction fluids from the user's mouth into the storage receptacle when the second controller is actuated; a toothpaste receptacle contained within the removeable portion; and a third controller on the base portion operationally connected to the toothpaste receptacle and wherein the toothpaste receptacle is adapted to dispense toothpaste from the toothpaste receptacle into the user's mouth or bristle area when the third controller is actuated.

The foregoing and other features and advantages of the present invention will be apparent from the following more detailed description of the particular embodiments, as illustrated in the accompanying drawings.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 1 illustrates one embodiment of the toothbrush device of the present invention.

DETAILED DESCRIPTION OF EXEMPLARY EMBODIMENT(S)

The following detailed description of the exemplary embodiments refers to the accompanying FIGURES that form a part thereof. The detailed description provides explanations by way of exemplary embodiments. It is to be understood that other embodiments may be used having mechanical and electrical changes that incorporate the scope of the present invention without departing from the spirit of the invention.

The present invention relates to a portable toothbrush having an internal water source that allows a user to brush his or her teeth while away from a bathroom, sink or other external water source. The embodiments described herein are exemplary embodiments and are not intended to limit the scope of the inventions claimed. For example, the toothbrush of the present invention preferably has a water source and a storage receptable for suctioning waste or rinse water from the user's mouth back into the storage receptacle for disposal after use. The toothbrush of the present invention can be automatic (electric motor or pump) or manual. The toothbrush can be a one-time use toothbrush or multiple-use.

FIG. 1 illustrates one embodiment of the toothbrush device of the present invention. In this embodiment, the toothbrush 10 of the present invention is comprised of a base 12, water controller 14, suction controller 16, toothpaste controller 18, head ejector 20, base gasket 22, water supply receptacle or water source 24, waste receptacle or storage area 28, toothpaste receptacle or storage area 26, head gasket 30, removable head 32, fluid hole or opening 34, cover 36, bristles 38, and small electric motor or pump 40.

In the embodiment of FIG. 1, there are three internal tubes (shown generally at 41) that connect each of the receptacles or storage areas to the toothbrush head in order to accomplish the functions of dispensing water from the water source, dispensing toothpaste to the bristle area and suctioning rinse material from the user's mouth to the waste receptacle. Receptacles can be storage areas or capsules within the toothbrush of the present invention. For example, in one embodiment, the capsules, receptacles or storage areas are individual pipettes, bellows or other suctioning device or syringe (shown generally at 28) with a compressible end that can be compressed to force a substance out of the other end of the storage area or it can be expanded (from a compressed state) to suction in substance into the storage area. In one embodiment, the storage receptacles can be removed for refill and/or cleaning. At purchase, the packaged toothbrush is provided with seals over the openings in the pipettes that can be easily punctured before use to allow access to the pipette storage areas.

The base is preferably constructed of metal or plastic and preferably does not require constant cleaning as it is the portion that is attached to the removable head portion that contains the components that require intermittent cleaning (at least for the multi-use embodiment, the single-use embodiment can be discarded after one use). In the embodiment of FIG. 1, the base is preferably comprised of three thumb switch controllers or actuators: one switch 14 for controlling the amount and force of water flow from the water supply receptacle to the fluid opening (for wetting and rinsing purposes), one switch 16 for controlling the suctioning of rinse water and or excess toothpaste from the user's mouth to the waste receptacle, and one switch 18 for controlling the dispensing of toothpaste from the toothpaste receptacle to the fluid opening.

In one embodiment, the toothbrush of the present invention is adapted so that the user can replenish the toothpaste and water supply receptacles. The head portion of the toothbrush preferably has a fluid hole that allows for clean rinse water to flow from the water supply to the bristles and to the user's mouth and for used rinse (used) water and toothpaste from the user's mouth to flow to the waste receptacle. It is also appreciated that the switches can be buttons, tabs, or levers for controlling the stated functions.

The head ejector is preferably a pressable button that ejects the removable head from the base. In this embodiment, the head portion is removable and disposable, but it is appreciated that the head portion can also be integral with the base portion.

The base gasket preferably provides a water-tight seal between the base portion and removable head. The head gasket completes the water-tight seal with the base. In one embodiment, the toothbrush head portion is adapted with a removeable cover to keep the bristles clean and dry after use.

In the embodiment shown in FIG. 1, a small motor or pump contained within the base portion is operationally connected to the water supply, and toothpaste supply to dispense water or toothpaste to the head bristle portion. For example, a vibrating mini-disc motor or mini pump motor can be used with the toothbrush of the present invention. The motor or pump forces water to the bristle area or user's mouth, and can be switched to suction used rinse water from the user's mouth into the waste storage area or receptacle after toothbrush use. It is appreciated that the toothbrush in this embodiment also has an internal battery for supplying power to the motor or pump.

In the embodiment of FIG. 1, the toothpaste can be manually dispensed via a slider switch or mechanism or it can also be dispensed using an internal motor or pump. It is also appreciated that the embodiment having the electric motor or pump can be configured with a removable head portion that may be a one-time disposable head portion or a multi-use disposable head portion. If a one-time use, toothpaste (or other teeth cleaning substance) may be placed, pre-packaged, onto the bristles instead of having a toothpaste receptacle and controller for dispensing toothpaste.

In the embodiment of FIG. 1, an internal pump or motor can be operationally connected to the waste supply receptacle for causing the suctioning of waste material from the user's mouth into the waste storage area. The internal pump or motor can be separate from, or the same as, the pump and motor operationally connected to the water receptacle and the toothpaste receptacle.

The following steps describe the process for using the toothbrush of the present as shown in FIG. 1:

1. User removes head portion from a resealable plastic pouch;
2. User snaps the head portion to the base portion causing a seal over the water supply and toothpaste receptacles to puncture;
3. User places the head portion in mouth and closes lips;
4. User dispenses toothpaste into the mouth by engaging the toothpaste controller;
5. User presses the water supply controller causing a stream of water to flow through fluid hole into the user's mouth, wetting bristles and toothpaste;
6. User brushes teeth, keeping mouth closed to secure liquids;
7. User presses suction controller to cause fluids to be sucked from the user's mouth into the waste receptacle;
8. User may continue Steps 5 through 7 to rinse mouth and suction;
9. When finished, user presses the head ejector button or switch causing the head portion to separate from the base portion; and
10. The head portion may be placed back into pouch or otherwise disposed of; or
11. The storage capsules may be removed from the head portion and cleaned and refilled with water and toothpaste.

In an alternative embodiment, the dispensing of water and toothpaste, as well as the suctioning of rinse water from the user's mouth are all done manually, instead of using an internal motor or pump. In this embodiment, water is introduced by sliding a switch, which compresses the water in the water supply receptacle. In other words, in one embodiment, an internal bellows holding water can be forced out by compressing the end of the bellows. In this embodiment, rinse water can also be suctioned into the waste receptacle using compressed bellows. Sliding a switch in a direction away from the head portion allows the bellows to expand, creating the necessary suction.

In this alternative manual embodiment, toothpaste can come pre-supplied on the bristles using a disposable single use head portion or unit. In such an embodiment, water from the water supply receptacle can be dispensed onto the bristle area or the user's mouth to wet the bristles and the supplied toothpaste.

The following steps describe the process for using the manual toothbrush of the present invention (alternative embodiment):

1. User removes the head portion from resealable plastic pouch;
2. User snaps the head portion to the base portion causing a seal over the water supply portion to puncture;
3. User places the head portion in the user's mouth and closes lips;
4. User engages the water controller switch causing stream of water to flow through the fluid hole or opening into mouth;
5. User brushes teeth, keeping mouth closed to secure liquids;
6. User engages the suction controller to cause fluids to be suctioned into the waste receptacle;
7. User may continue Steps 4 and 6 to rinse mouth and suction repeatedly;
8. When finished, the user presses the ejector switch causing the head portion to separate from the base portion; and 9. The head portion may be placed back into pouch or otherwise disposed of.

While certain embodiments of the present invention are described in detail above, the scope of the invention is not to be considered limited by such disclosure, and modifications are possible without departing from the spirit of the invention as evidenced by the following claims:

What is claimed is:

1. A portable toothbrush comprised of:
   a base portion having a first end, the base portion adapted to be gripped by a user;
   a removable portion having a bristle area, the removable portion removably engaged to the first end of the base portion;
   a fluid opening in the removable portion;
   a water source contained within the toothbrush; and
   a first controller on the base portion operationally engaged to the water source;
   wherein the water source is adapted to dispense water from the water source into the user's mouth when the first controller is actuated;
   a storage receptacle contained within the toothbrush;
   a second controller on the base portion operationally engaged to the storage receptacle and wherein the storage receptacle is adapted to suction fluids from the user's mouth into the storage receptacle when the second controller is actuated; and
   an electric motor or pump electrically connected to the water source configured to provide force to the water source to dispense water from the water source into the user's mouth when the first controller is actuated.

2. The portable toothbrush of claim 1, further comprising:
   a toothpaste receptacle contained within the removable portion; and
   a third controller on the base portion operationally engaged to the toothpaste receptacle and wherein the toothpaste receptacle is adapted to dispense toothpaste from the toothpaste receptacle into the user's mouth or bristle area when the third controller is actuated.

3. The portable toothbrush of claim 1, further comprising:
   teeth cleanser applied to the bristle area.

4. The portable toothbrush of claim 2, further comprising:
   a tube for operationally connecting the toothpaste receptacle to the fluid opening in the removable portion.

5. The portable toothbrush of claim 1, further comprising:
   a tube for operationally connecting the storage receptacle to the fluid opening in the removable portion.

6. The portable toothbrush of claim 1, further comprising:
   a tube for operationally connecting the water source to the fluid opening in the removable portion.

7. The portable toothbrush of claim 1, wherein the water source and storage receptacle are each bellows having a first end that is compressible and a second end having an opening.

8. The portable toothbrush of claim 1, further comprising:
   a cover in an elongated tubular shape for encompassing the entire toothbrush, and wherein the cover may be used to dispose of the removable portion after use.

9. The portable toothbrush of claim 1, further comprising:
   a base gasket for providing a water-tight seal between the base portion and removable portion.

10. The portable toothbrush of claim 1, further comprising:
    an ejector controller on the base portion for ejecting the removable portion from the base portion.

11. A portable toothbrush comprised of:
    a base portion having a first end, the base portion adapted to be gripped by a user;
    a removable portion having a bristle area, the removable portion removably engaged to the first end of the base portion;
    a fluid opening in the removable portion;
    a water source contained within the toothbrush;
    a first controller on the base portion operationally engaged to the water source;
    wherein the water source is adapted to dispense water from the water source into the user's mouth when the first controller is actuated;
    a storage receptacle contained within the toothbrush; and
    a second controller on the base portion operationally engaged to the storage receptacle and wherein the storage receptacle is adapted to suction fluids from the user's mouth into the storage receptacle when the second controller is actuated.

12. The portable toothbrush of claim 11, further comprising:
    a toothpaste receptacle contained within the removable portion; and
    a third controller on the base portion operationally engaged to the toothpaste receptacle and wherein the toothpaste receptacle is adapted to dispense toothpaste from the toothpaste receptacle into the user's mouth or bristle area when the third controller is actuated.

13. A method of brushing a user's teeth, comprising the steps of:
    providing a base portion having a first end, the base portion adapted to be gripped by a user;
    providing a removable portion having a bristle area, the removable portion removably engaged to the first end of the base portion; wherein the removable portion has a fluid opening and contains a water source;
    actuating a first controller on the base portion;
    dispensing water from the water source into the user's mouth when the first controller is actuated;
    providing a storage receptacle contained within the toothbrush;
    actuating a second controller on the base portion; and
    suctioning fluids from the user's mouth into the storage receptacle when the second controller is actuated.

14. The method of claim 13, further comprising the steps of:
    providing a toothpaste receptacle contained within the removable portion;
    actuating a third controller on the base portion; and
    dispensing toothpaste from the toothpaste receptacle into the user's mouth or bristle area when the third controller is actuated.

15. The method of claim 13, further comprising the steps of:
    providing a cover in an elongated tubular shape for encompassing the entire toothbrush; and
    disposing of the removable portion after use.

16. The method of claim 13, further comprising the step of:
    actuating an ejector controller on the base portion for ejecting the removable portion from the base portion.

* * * * *